Patented Sept. 25, 1923.

1,468,741

UNITED STATES PATENT OFFICE.

SAMUEL PEACOCK, OF WHEELING, WEST VIRGINIA, ASSIGNOR TO WILLIS G. WALDO, OF WASHINGTON, DISTRICT OF COLUMBIA.

PRODUCTION OF PHOSPHORIC ACID.

No Drawing. Application filed December 8, 1921. Serial No. 520,996.

*To all whom it may concern:*

Be it known that I, SAMUEL PEACOCK, a citizen of the United States, residing at Wheeling, in the county of Ohio and State of West Virginia, have invented certain new and useful Improvements in the Production of Phosphoric Acid; and I do hereby declare the following to be a full, clear, and exact description of the invention, such as will enable others skilled in the art to which it appertains to make and use the same.

This invention relates to a process of making phosphoric acid and has for its object to improve the methods heretofore disclosed.

With this and other objects in view the invention consists in the novel steps and combinations of steps constituting the process, all as will be more fully hereinafter disclosed and particularly pointed out in the claims.

In carrying out this invention, one may take phosphate rock, finely divide the same, and mix therewith in reacting proportions an alkali metal chloride such as sodium chloride NaCl and heat the mixture to about 1100° C. in a closed furnace whereupon the following reaction will occur:

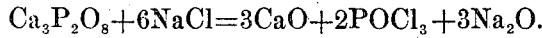
$$Ca_3P_2O_8 + 6NaCl = 3CaO + 2POCl_3 + 3Na_2O.$$

The phosphoryl chloride $POCl_3$ being a gas at the temperature of the reaction, is readily conducted from the furnace chamber under conditions which will exclude contact with air, or the presence of free oxygen, whereupon it may be either condensed to the liquid form for storage, or it may be hydrolysed with water to form hydrochloric acid and phosphoric acid $H_3PO_4$ in accordance with the following equation:

$$2POCl_3 + 6H_2O = 6HCl + 2H_3PO_4.$$

The mixture of hydrochloric and phosphoric acids thus produced may be hydrated to form commercial muriatic and phosphoric acids of the desired concentration, whereupon the hydrochloric acid is separated from the phosphoric acid by distillation.

All the phosphoryl chloride may be conveniently removed from the residue of the furnace charge by flushing the reaction chamber with free nitrogen gas, after which said residue containing sodium oxide is raised to say 1300° C. whereupon said sodium oxide is sublimed out of the furnace, collected in suitable condensers, cooled and recovered as such. The residue of charge material after the removal of the values, is removed and the furnace recharged.

Of course, the sodium oxide thus recovered may be reduced with carbon to produce elemental sodium if so desired.

It is an important feature of this invention that one is enabled to liberate phosphoryl chloride without the interaction of carbon in any form, thus preventing the formation of oxides of phosphorus at the expense of the oxidized sodium derived from the sodium chloride. This constitutes a very valuable industrial transposition, and an important feature of this invention.

What I claim is:

1. The process of making phosphoric acid which consists in reacting on tricalcium phosphate with sodium chloride in the proportions of six molecules of sodium chloride to each molecule of tricalcium phosphate present to form phosphoryl chloride and sodium oxide; separating said chloride from said oxide; adding water to said chloride to form a mixture of hydrochloric and phosphoric acids; and separating out said phosphoric acid, substantially as described.

2. The process of making hydrochloric and phosphoric acids which consists in providing a mixture of tricalcium phosphate and sodium chloride in the proportions of six molecules of sodium chloride to each molecule of tri-calcium phosphate present; heating said mixture to a reacting temperature to produce phosphoryl chloride, and sodium oxide; separating said chloride from said oxide; hydrating said chloride to form a mixture of phosphoric and hydrochloric acids; and separating said acids, substantially as described.

In testimony whereof I affix my signature.

SAMUEL PEACOCK.